Dec. 29, 1953 — W. G. NOLCKEN — 2,663,998
CONTROL VALVE FOR FLUID SYSTEMS
Filed Aug. 10, 1951 — 3 Sheets-Sheet 1
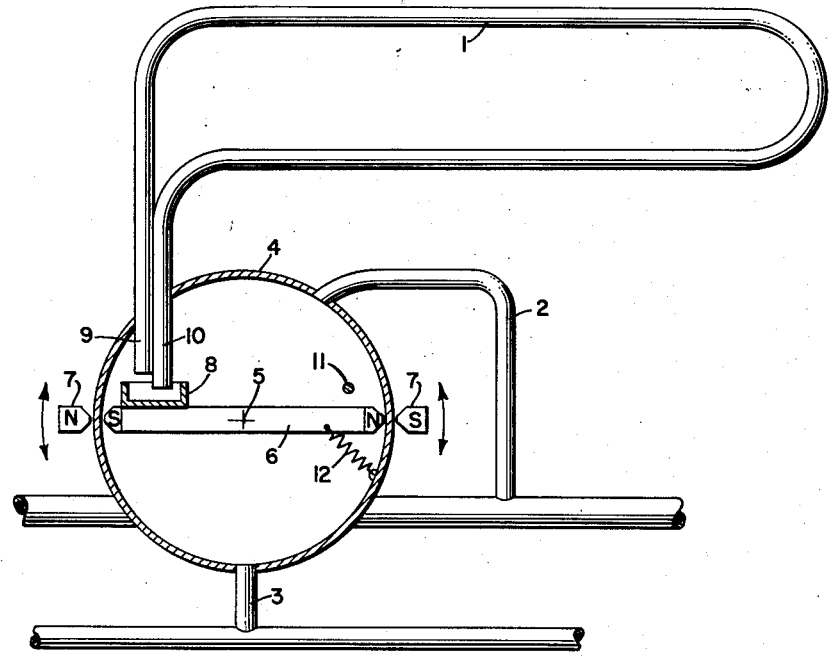
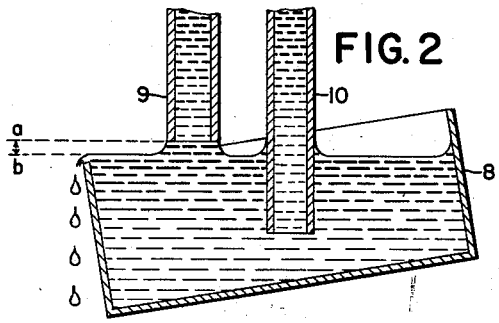
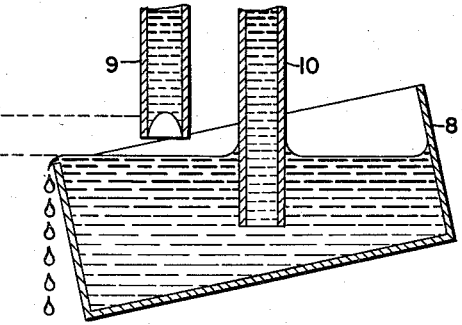
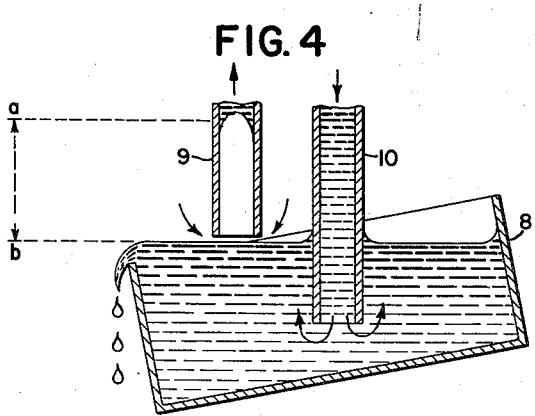
INVENTOR
WOLDEMAR G. NOLCKEN
BY *Maurice A. Crews*
ATTORNEY

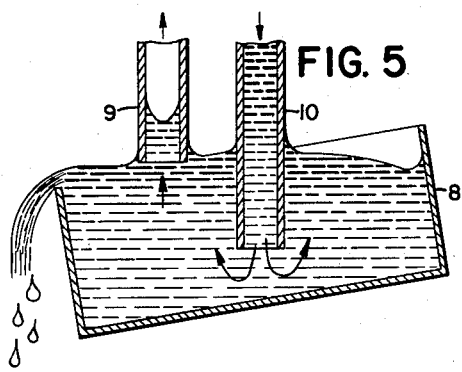
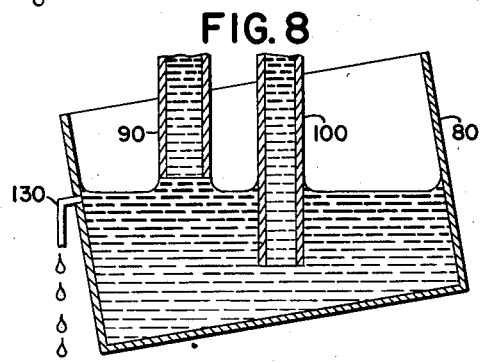
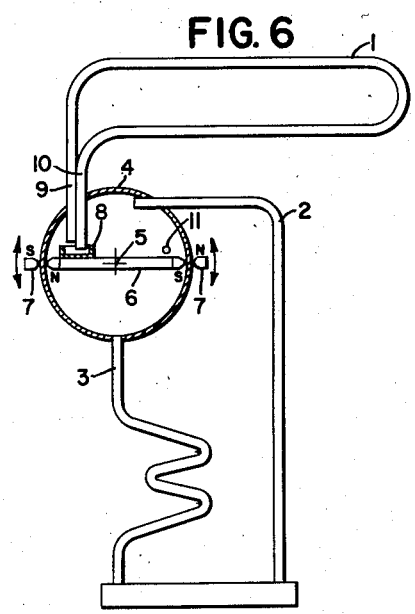
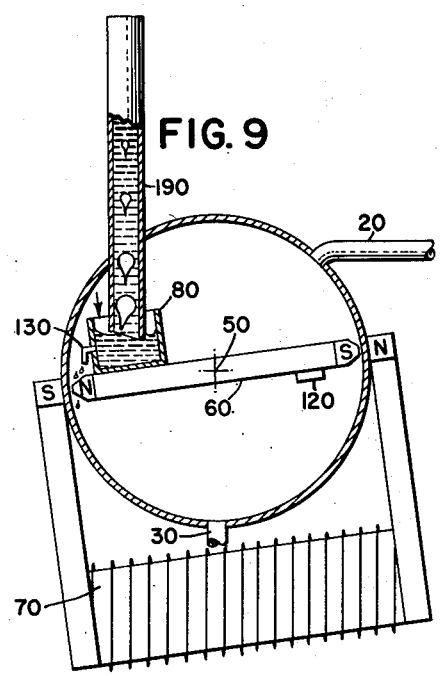
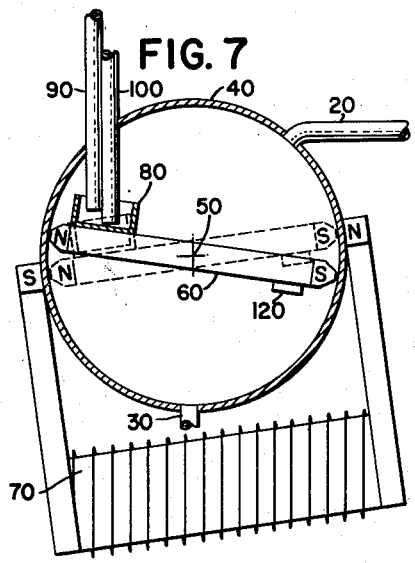
INVENTOR
WOLDEMAR G. NOLCKEN
BY Maurice A. Crews
ATTORNEY Dec. 29, 1953     W. G. NOLCKEN     2,663,998
CONTROL VALVE FOR FLUID SYSTEMS
Filed Aug. 10, 1951     3 Sheets-Sheet 3
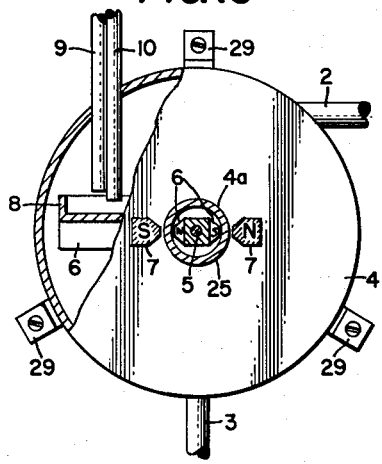
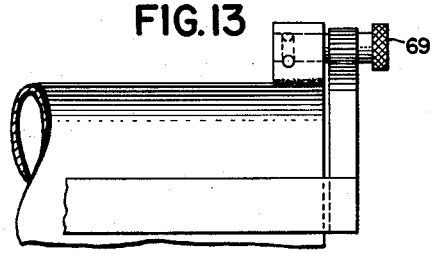
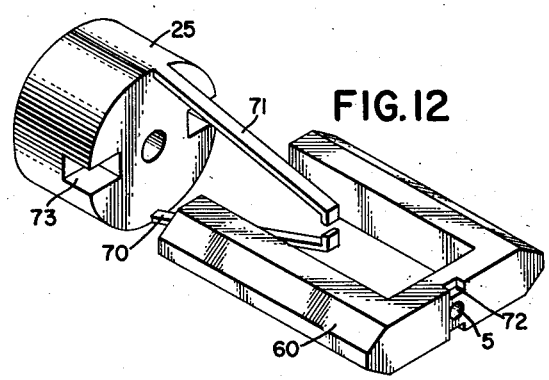
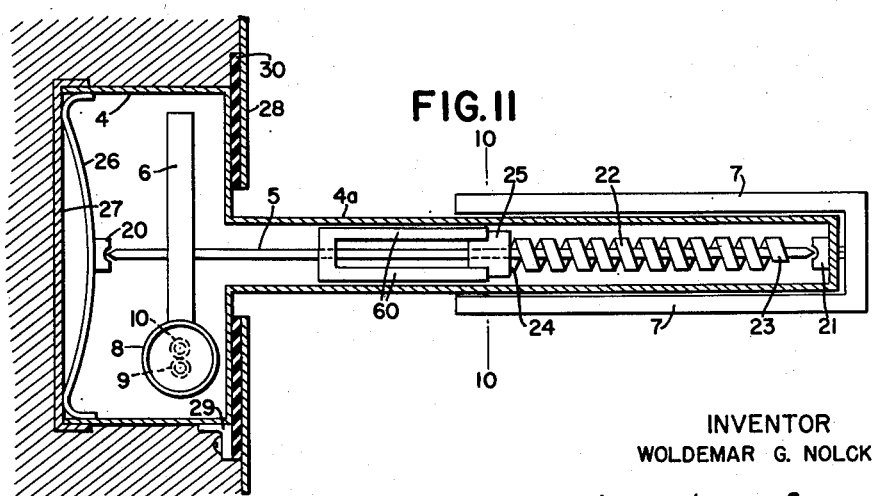
INVENTOR
WOLDEMAR G. NOLCKEN
BY *Maurice A. Crewd*
ATTORNEY Patented Dec. 29, 1953

2,663,998

UNITED STATES PATENT OFFICE 2,663,998

CONTROL VALVE FOR FLUID SYSTEMS

Woldemar G. Nolcken, Headington, Oxford, England, assignor to Pressed Steel Company Limited, Cowley, Oxford, England, a British company Application August 10, 1951, Serial No. 241,192

Claims priority, application Great Britain March 2, 1951

15 Claims. (Cl. 62—2)

1

The present invention relates to control valves of the type described in my co-pending application Serial No. 95,497, Control Valve, filed May 26, 1949, now Patent No. 2,613,505, issued October 14, 1952.

In valves of this type, circulation of a condensible vapour and of its liquid condensate through a condenser is controlled by means of a body of liquid condensate contained in an open vessel into which depend the inlet and outlet pipes of said condenser, said body of liquid condensate making and breaking liquid contact with one of said condenser pipes depending on the position of said vessel relative to said pipes.

According to my prior invention pressure responsive means such as flexible gas-filled bellows are provided for controlling the position of said vessel relative to said pipes, said bellows expanding or contracting in response to changes of physical conditions such as pressure, temperature, composition of fluids and the like within the space where controlled conditions are provided.

According to the present invention the relative position of said vessel with respect to said pipes within an hermetically sealed valve housing is determined by magnetic or electro-magnetic means from the exterior of said housing in a manner well known per se.

The magnetic or electromagnetic means may be operated in any manner convenient such as by manual means or by automatic means variable in response to physical conditions within the space where controlled conditions are provided.

Alternatively said magnetic or electromagnetic means may, from without the valve housing, control automatic means for determining the relative position of the liquid condensate containing vessel with respect to the condenser pipes depending thereinto, said automatic means being located within the hermetically sealed valve housing or within a suitable extension thereof.

The invention is illustrated in the accompanying drawings, of which Figure 1 is a diagrammatic representation of a control for a steam heating plant, Figures 2 to 5 are enlarged diagrammatic views of the open vessel in different stages of operation, Figure 6 is a representation similar to Figure 1, of a control for a refrigerating plant, Figure 7 shows a modification of the valve of Figure 6, Figures 8 and 9 are representations of modifications of the valve of Figure 7, Figures 10 and 11 are respectively a plan and sectional elevation of a valve adaptable for use with a refrigerating system including a secondary evaporating circuit, Figure 12 is a detail showing in

2 perspective the assembly of the magnet and Figure 13 shows diagrammatically an adjustment for the magnet.

The condenser 1, of Figure 1, is fed with live steam via the supply pipe 2 and condensed water returns via the pipe 3 through control valve housing 4.

Preferably, the housing 4 is of cylindrical shape and made of non-magnetic material. Within the housing and pivotally supported at its centre-of-gravity by a central shaft 5 is a bar magnet 6 (the two poles of which are marked N and S).

An outer magnet 7 (the poles of which are similarly marked N and S) is rotatably mounted on a shaft (not shown) outside the housing and arranged concentrically with the inner shaft 5. The magnets are so arranged that dissimilar poles lie adjacent each other on each side of the non-magnetic wall of the valve-housing 4 with the two air-gaps on each side being as small as possible.

In the well known manner of magnetic clutches a rotary displacement of the outer magnet causes the inner magnet to follow and by fixing the outer magnet in any position the inner magnet will be fixed in a corresponding position within the housing 4.

Rigidly fixed to one end of the bar magnet 6 is a small open vessel 8, in the form of a cup and an appropriate counter-balance is provided by spring 12 or a weight, corresponding to weight 120 of Figs. 7 and 9, on the opposite pole.

The two end pipes 9 and 10 of the condenser 1 project vertically downwards into the hermetically sealed housing 4 and depend within the cup 8, the pipe 10 depending to a greater depth than the pipe 9, of which the open end is substantially level with the upper edge of the cup 8.

The liquid condensate contained in the cup 8 covers or uncovers the pipe 9 in its vertical rise or fall due to small angular displacements of the bar magnet 6 about its shaft 5 when moved by the outer magnet 7, which may be moved about its axis by any means whatsoever. A mechanical stop 11 is provided, where convenient, to prevent movement of the magnet 6 to a position where the pipe 10 would no longer be covered by the liquid in the cup 8, while movement of the magnet in the opposite direction is limited by the abutment of the pipe 10 against the bottom of the cup 8.

When in its "open" position i. e. with the bar magnet 6 resting against the stop 11, the liquid level in the cup 8 is at its lowest position in relation to the pipes 9 and 10, the opening of the pipe 10 being below the liquid level and that of the pipe 9 above such level. Accordingly such liquid as may be present in the condenser 1 flows into the cup 8, wherefrom it overflows into the valve housing 4 and hence into the condensate drain pipe 3. At the same time vapour supplied by pipe 2 enters freely through pipe 9 and condenses inside the condenser 1.

In this "open" position, the greatest possible heat-exchanging surface of the condenser 1 is available for condensation.

When the valve is "closed" by moving the magnet 6 into the extreme opposite position i. e. with the pipe 10 abutting against the bottom of the cup 8 and with the opening of pipe 9 below the level of the upper edge of said cup, all liquid in the cup 8, above the level of the opening of pipe 9, is sucked back into the condenser 1. Accordingly no liquid condensate can overflow from the cup 8 into the housing 4, while vapour enters the condenser 1 through the pipe 9 to condense therein.

In course of time the whole of the condenser 1 is filled with liquid condensate and all circulation therethrough stops.

In this "closed" position, no heat exchanging surface of the condenser 1 is available for condensation.

When in an intermediate position between the extreme "open" and "closed" positions mixed liquid and vapour in the shape of alternate slugs or pistons rise in the pipe 9 whilst liquid condensate descends through the pipe 10 into the cup 8 and hence overflows into the housing 4.

The valve is now in a "partly open" position and some of the total heat exchanging surface of the condenser 1 is available for condensation.

It will be understood that the proportion of the total surface available for condensation will depend on the relative volumes of liquid and vapour "slugs" entering the pipe 9 and this in turn is determined by the position of the cup 8 in relation to the opening of the pipe 9. When this is near the "closed" position the available condensing surface will be small and vice versa. There is in fact a continuous transition between the "closed" position when no condensing surface is available and the "open" position when the whole heat exchange surface is available for condensation.

This will be more readily understood by reference to Figures 2 to 4.

In Figure 2 the cup 8 has just been moved into the "partly open" from the fully "closed" position. The condenser is still full of liquid and there is no circulation. The main liquid level in the cup 8 has, however, fallen below the opening of the pipe 9, but liquid contact is still maintained by surface tension between the outer surface of this pipe and the main body of liquid in the cup. At the same time the meniscus of the liquid in the cup 8 has risen above the edge of the cup and liquid is overflowing into the valve housing. The height of the unsupported liquid column in the pipe 10, of which the hydraulic head is counterbalanced by the forces of surface tension of the liquid making contact with the pipe 9, is indicated by the distance a—b. When more liquid overflows from the cup 8, the mean liquid level descends to a point where surface tension at the outer surface of the pipe 9 can no longer support the head a—b and the meniscus breaks. The liquid in the pipe 9 now assumes the shape shown in Figure 3, i. e. the forces of surface tension now act on the inner surface of the pipe 9, which being naturally of smaller cross-sectional area than its outer surface is able to support a somewhat greater head a—b.

A further lowering of the level in the cup 8 causes the liquid surface seal in the pipe 9 to break. Liquid is now syphoned over through the condenser at an accelerated rate as the head a—b increases progressively in height. Vapour enters the pipe 9 and an equal volume of liquid descends through the pipe 10 into the cup 8 in the manner indicated in Figure 4.

The sudden discharge of liquid from the pipe 10 into the cup 8 causes the level in the cup to rise to the point at which it again makes contact with the pipe 9, as indicated in Figure 5, and further entry of vapour into the pipe 9 is blocked, liquid being now sucked in from the cup 8, which lowers the level therein until the seal is again broken and a new syphoning stroke follows.

It will be understood that the whole process amounts to a discontinuous syphoning action of liquid from the cup 8 through the condenser 1 and back into the cup 8, together with vapour entering the pipe 9 to vapor-lift the liquid therein with an equal weight of liquid condensate returning from the pipe 10 into the cup 8 and hence overflowing into the housing 4.

The rate of overflow from the cup 8 into the housing 4 is proportional to the height of the mean level of liquid in the cup 8 above the level of the edge of the cup, and this in turn is determined by the difference in level between said edge and the opening of the pipe 9.

In this way the position of the cup 8 in relation to the pipe 9 determines the rate of flow of condensate and with it the rate of heat-flow from the condenser into the ambient atmosphere, within limits prescribed by the fully open and fully closed positions of the valve.

It will also be understood that the length of travel of the cup relative to the pipe 9, necessary for opening and closing the valve, will depend on the dimensions of said pipe and cup as well as on the nature of the liquid and especially its density and surface tension.

Thus, with water at 100° C, in a condenser made of a pipe of 0.178" bore, and a cup of 1" diameter, the length of vertical travel of the cup is approximately 0.2", whilst with a refrigerant such as dichlorodifluoromethane at —5° in apparatus of the same dimensions, the length of travel is 0.04".

In Figure 6 is shown a valve similar to that of Figure 1, for controlling a refrigerating system including a secondary circuit. The condenser 1 is in thermal contact with a body kept at a low temperature, such as the primary evaporator of a refrigerator and the vapour supply pipe 2 and condensate drain pipe 3 are joined together to form a secondary evaporator of the type described in my co-pending application Serial No. 79,481, Refrigerating System with Downwardly Evaporating Secondary Circuit, filed March 3, 1949, new Patent No. 2,617,271, issued November 11, 1952, but it should be understood that any other type of evaporator could be used equally well. The whole system is filled with an appropriate quantity of a suitable refrigerant and hermetically sealed off.

The operation is in the well-known manner of secondary refrigerating systems, the valve controlling the amount of heat admitted to the condenser and by this means the amount of heat absorbed from the refrigerated chamber by the secondary evaporator.

This type of valve is not suitable for operation at temperatures below the freezing point of water, when frost and ice due to atmospheric condensation form on the outer surfaces of the cold valve housing 4 and obstruct the free movement of the outer magnet 7, unless the whole valve mechanism is enclosed in a sealed chamber.

Valves of this type may be operated by electromagnetic means and a valve so operated is shown diagrammatically in Figure 7. This valve is suitable for controlling either heating appliances or secondary refrigeration circuits in the manner described in connection with Figures 1 and 6.

The vapour supply pipe 20 and the liquid condensate drain pipe 30 lead into the hermetically sealed housing 40. The two condenser pipes 90 and 100 pass into the housing 40 and depend within the cup 80 supported by the permanent magnet 60, which magnet is pivotably mounted on the central shaft 50.

In contradistinction to the arrangements shown in Figures 1 and 6 the magnet 60 is gravitationally unbalanced. Its gravitational bias may be in the direction towards the "closed" position as shown in Figure 7 or it may act in the opposite direction. By way of example, a small weight 120 is shown in Figure 7, attached to one end of the magnet 60 so as to cause it to take up the position shown in full lines in Figure 7 i. e. with the end of the pipe 100 abutting against the bottom of the cup 80.

Outside the housing 40 and attached to it in a fixed position is an electro-magnet 70 with the two pole pieces N and S. When the electromagnet is energised it pulls the permanent magnet 60 into the position shown in dotted lines i. e. into the "open" position, but when the energising current is switched off the magnet 60 returns by gravity into the "closed" position.

If alternating current is used for energising the magnet 70, then a bar of soft iron or a packet of iron laminations or wires must be used in place of the permanent magnet 60 as will be readily understood.

The switch which makes or breaks the current which energises the electromagnet 70 may be operated by hand or by any suitable automatic means, such, for example, as by a thermostat responsive to the temperature of the space to be heated or cooled.

When used in a secondary refrigerating circuit the valve of Figure 7 is free from the temperature limitations described for the valve of Figure 6, i. e. the formation of a coat of ice on the outer surface of the cold housing 40 does not interfere with the operation of the valve since the electromagnet is permanently secured to the housing 40 and does not move.

The control effected by the valve of Figure 7 differs somewhat from that of the valve of Figures 1 and 6 inasmuch as the electromagnetically operated valve can be alternately in the fully "closed" or the fully "open" position but cannot remain in any of the intermediate positions for any length of time. Accordingly the control will be of the intermittent open-closed type as distinct from the continuous modulation type of control provided by the valve of Figures 1 and 6, when operating with the magnet 6 in the intermediate region between the closed and open positions.

It should be understood that the biassing weight 120 may if desired be replaced by a spring, corresponding to spring 12 of Fig. 1, acting in opposition to the electromagnet.

The valve of Figure 8 which is a modified arrangement of the valve of Figure 7, shows a cup 80 of somewhat greater depth than those already described which cup is provided with an overflow tube 130 of restricted bore. Liquid condensate from the cup 80 flows through this tube at a predetermined rate corresponding with its dimensions until the liquid level in the cup has dropped to the inlet opening of the overflow tube. Accordingly the level of the overflow tube is now the controlling level whereas the edge of the cup served this purpose in former cases. Movement of the cup in response to the energisation of the electromagnet raises this level above, or lowers it below, the inlet of the pipe 90, corresponding to the "open" or "closed" positions of the valve respectively. Due to the restricted overflow from the cup 80 imposed by the tube 130, the sudden transition from the open to the closed position of the valve or vice versa, is smoothed out and intermittent sudden discharge of relatively large quantities of condensate from the condenser upon opening of the valve is prevented.

In Figure 8 the valve is shown in the "open" position but circulation through the condenser has not yet started for similar reasons given in connection with Figure 2.

The invention is not limited to the use of magnetic or electromagnetic means for operating valves of the type described in which two condenser pipes depend into the valve housing and coact with the condensate cup, but also includes a condenser in which one pipe only, as shown in Figure 9, coacts with the condensate cup.

The valve, shown by way of example, in Figure 9 is operated electromagnetically in the same way as the valve shown in Figure 7 and similar numerals are used to denote similar parts in the two figures. The two pipes 90 and 100 in Figure 7 are replaced in Figure 9 by one pipe 190, of sufficient cross-sectional area to allow free passage of vapour through the liquid in the pipe without gas locking. Preferably the inlet opening of pipe 190 is cut obliquely or alternatively the mouth of the pipe may be provided with cut out openings for the entry of vapour. The cup 80 in Figure 9 is of the type shown in Figure 8, i. e. somewhat deeper and provided with a restricted overflow pipe 130.

This arrangement would be suitable for applications where the condenser has a shape other than a coiled pipe or the like, such for example, as that shown in Figures 7 and 8 of my beforementioned, co-pending application Serial No. 95,497, now Patent No. 2,613,505. Generally it may be said that two condenser pipes are shown simply for convenience, because it is usual to provide a condenser by bending a length of pipe, which leaves the two ends as inlet and outlet.

It has been stated that the valves of this invention may be operated by automatic means located within the hermetically sealed valve housing or an extension thereof, with said automatic means in turn controlled from without the housing or its extension by magnetic or electromagnetic means.

By way of example, such a control valve suitable for use with secondary refrigerating systems is illustrated in Figures 10 and 11.

The valve is contained in a hermetically sealed housing 4 with a cylindrical extension 4a. The secondary evaporator vapour return pipe 2 and the liquid condensate supply pipe 3 as well as the two secondary condenser pipes 9 and 10 lead into the housing 4, the pipes 9 and 10 depending vertically into the housing 4 in line with the open cup 8 and being of unequal length as already explained. The cup 8 is secured to the arm 6 preferably made of non-magnetic, non-heat conducting material and rigidly connected to the central shaft 5, which rests in the two end-bearings 20 and 21. A temperature-sensitive bimetallic strip 22 is arranged in the shape of a helical coil around the shaft 5. The end 23 of the strip 22 is secured to the shaft 5 near the bearing 21, by welding, brasing or soldering, whilst the other end 24 is secured in a similar manner to a connecting piece 25 of non-magnetic material which is rotatably mounted on the shaft 5 and also is rigidly connected with the permanent magnet 60 rotatably mounted on the shaft 5. It will be understood that any coiling or uncoiling of the helical strip 22 will cause the magnet 60 and the arm 6 to rotate in opposite directions.

In order to ensure that the magnet 60 moves as one with and is retained by the piece 25, arms 70 and 71 (Figure 12) project from said piece and engage by means of their turned over ends in notches 72 formed in the magnet, the arms of which register with slots 73 formed in the piece 25.

Outside the tubular extension 4a of the valve housing 4 is another permanent magnet 7, rotatable on the outer surface of the extension 4a but fitting snugly thereon, so as to be kept in position by frictional resistance. The magnet 7 acts upon the magnet 60 through the non-magnetic wall of the extension 4a keeping it in a position where dissimilar poles are on opposite sides of the wall.

In order to assemble the valve the various parts are mounted on the spindle 5 as described and the whole combination inserted into the housing 4 and its extension 4a, with the end of the spindle 5 resting in the bearing 21. The leafspring 26 to which is secured the bearing 20 is then slipped into the housing 4, and may be held in position temporarily in any convenient manner while the mechanism is examined for correct alignment and freedom from frictional resistance. Finally the cover 27 is placed in position and hermetically sealed at its edges by means of solder or the like.

The valve is now ready to be fitted into a refrigerator.

Preferably the body 4 is located within the heat insulation while the extension 4a protrudes into the food storage chamber through a suitable aperture in the liner 28, to which the valve 4 may be secured by brackets 29 through the intermediary of a rubber or like gasket. The magnet 7 is then slipped on to the tube 4a from within the food storage chamber.

Connection having been made between pipes 9 and 10 and the secondary condenser as well as pipes 2 and 3 and the secondary evaporator, the system is evacuated and charged with a suitable quantity of secondary refrigerant in the well-known manner.

The operation of the secondary circuit and its control by means of the cup 8 moving in relation to the pipes 9 and 10 is as has been already described.

It will be understood that angular displacements of the arm 6 and with it the cup 8 can be produced by turning the magnet 7 inside the food storage chamber by hand. The magnet 7 moves the magnet 60, which through the connecting piece 25 and the helical strip 22 transmits its motion to the spindle 5 and the arm 6. In this way the magnet 7 may be used for setting the valve to operate at the desired temperature in response to reactions of the strip 22.

This strip is preferably made of Invar and manganese alloy 15.75″ long, 0.2″ wide and 0.1″ thick, coiled into a cylindrical helix of 20 turns of 0.25″ diameter and 4⅝″ long, having an unresisted angular displacement of 2° 18″ per °F. temperature change and a torque of 1.2 oz. in./°F.

When the magnet 7 has been fixed in a position suitable for keeping the food storage chamber temperature where desired, say at 40° F., the end 24 of the strip 22 is anchored in a fixed position with reference to the housing 4a and 4, while the end 23, which is secured to the spindle 5, is free to rotate thereby to move said spindle 5 together with the arm 6 and cup 8 when the strip 22 coils and uncoils in response to temperature changes.

Normally the strip is at a temperature intermediate between that of the air in the food storage chamber, and that of the evaporating refrigerant in the cup 8 and its overflow into the housing 4, which temperature would be of the order of 35° F. when the food storage chamber is at 40° F., with some of the heat absorbed by the housing 4a from the surrounding air being conducted away towards the somewhat colder portion of the housing 4.

It will be understood that while the magnet 7 is in a fixed position, a modulating temperature control of the food storage space is provided by the strip 22 moving the cup 8 in response to changes in temperature, in such a way as to keep the predetermined food storage space temperature constant within narrow limits, whereas a change in the position of the magnet 7 will cause a corresponding change in the predetermined control temperature.

The magnet 7 can be used for an initial calibration setting of the valve to operate at the desired temperature or alternatively it may be used for resetting as and when required to operate at different temperatures corresponding with different conditions of storage required from time to time in the food storage chamber. In order to facilitate such manual adjustments of the valve by means of altering the position of magnet 7, the additional fitting consisting of the vernier adjusting screw 69 shown in Figure 13 may be provided, so as to increase the movement necessary for getting the minute changes of position of magnet 7 which otherwise would be difficult to obtain with the required accuracy when displacing the magnet directly by hand.

I claim:

1. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends and magnetic means disposed exteriorly of the housing to adjust the position of said vessel with respect to the open end of said means.

2. A control valve for controlling the circulation of a condensible vapour and its liquid condensate through a condenser, comprising an hermetically sealed housing, condenser inlet and outlet pipes projecting into said housing, an open vessel within said housing into which vessel the open ends of the condenser inlet and outlet pipes depend, a support for said vessel in the form of a balance arm having its extremities adjacent the housing wall and oppositely magnetically poled and magnetic means disposed exteriorly of the housing in juxtaposition to the poles of the balance arm.

3. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends, a support for said vessel in the form of a balance arm having its extremities adjacent the housing wall and oppositely magnetically poled biassing means for said balance arm and magnetic means disposed exteriorly of the housing in juxtaposition to the poles of the balance arm.

4. A control valve as claimed in claim 3 in which the biassing means consist of a counterweight.

5. A control valve as claimed in claim 3 in which the biassing consists of springs.

6. A control valve for controlling the circulation of a condensible vapour and its liquid condensate through a condenser, comprising an hermetically sealed housing, condenser inlet and outlet pipes projecting into said housing, an open vessel within said housing, the condenser outlet pipe projecting into said open vessel to an extent greater than that of the condenser inlet pipe, a support for said vessel and magnetic means disposed exteriorly of the housing to adjust the position of said vessel with respect to the open ends of said pipes.

7. A control valve for controlling the circulation of a condensible vapour and its liquid condensate through a condenser comprising an hermetically sealed housing, an extension of said housing, condenser inlet and outlet pipes projecting into said housing, an open vessel within said housing, a support for said vessel in the form of a balance arm pivoted on a spindle, said spindle projecting into the housing extension, a temperature sensitive bi-metallic strip wound in the form of a helix surrounding said spindle and secured at one extremity thereto, a rotating collar surrounding said spindle and secured to the other extremity of the bi-metallic strip, a permanent magnet secured to said spindle and means to couple said collar with said permanent magnet.

8. A control valve for controlling the circulation of a condensible vapour and its liquid condensate through a condenser, comprising an hermetically sealed housing, condenser inlet and outlet pipes projecting into said housing, an open vessel within said housing, the condenser outlet pipe projecting into said open vessel to an extent greater than that of the condenser inlet pipe, a support for said vessel in the form of a balance arm pivoted on a spindle, said spindle projecting into the housing extension, a temperature sensitive bi-metallic strip wound in the form of a helix surrounding said spindle and secured at one extremity thereto, a rotating collar surrounding said spindle and secured to the other extremity of the bi-metallic strip, a permanent magnet secured to said spindle and means to couple said collar with said permanent magnet, and a permanent magnet disposed exteriorly of said housing extension to pre-set the position of the permanent magnet secured to the spindle.

9. A control valve for controlling the circulation of a condensible vapour and its liquid condensate through a condenser, comprising an hermetically sealed housing, a condenser pipe projecting into said housing, said condenser pipe being of a size to permit the passage therethrough simultaneously in reverse directions of a vapour and its condensate, an open vessel within said housing into which vessel the open end of the condenser pipe depends and magnetic means disposed exteriorly of the housing to adjust the position of said vessel with respect to the open end of said pipe.

10. A control valve for controlling the circulation of a condensible vapour and its liquid condensate through a condenser, comprising an hermetically sealed housing, condenser inlet and outlet pipes projecting into said housing, an open vessel within said housing into which vessel the open ends of the condenser inlet and outlet pipes depend, a support for said vessel in the form of a balance arm, a permanent magnet carried by said balance arm with the poles adjacent the housing wall and a movable permanent magnet arranged exteriorly of the housing and poles of which exterior magnet coact with the poles of the balance arm.

11. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends, a support for said vessel in the form of a balance arm, a permanent magnet carried by said balance arm having its poles lying adjacent the housing wall, a fixed direct-current electro-magnet outside said housing and means operable automatically by any known means in accordance with predetermined conditions to control said electro-magnet.

12. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends, a support for said vessel in the form of a balance arm, said balance arm being of laminated steel with its ends adjacent the housing wall and a fixed alternating current electro-magnet disposed exteriorly of the housing.

13. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends, a support for said vessel in the form of a balance arm, a permanent magnet carried by said balance arm having its poles lying adjacent the housing wall, a fixed direct-current electro-magnet outside said housing, means to operate said electro-magnet in accordance with variations of temperature conditions, and biassing means for said balance arm.

14. A control valve for controlling the circulation of a condensible vapour and its liquid condensate through a condenser, comprising an hermetically sealed housing, condenser inlet and outlet pipes projecting into said housing, an open vessel within said housing into which vessel the open ends of the condenser inlet and outlet pipes depend, a support for said vessel in the form of a balance arm, a permanent magnet carried by said balance arm with the poles adjacent the housing wall, a movable permanent magnet arranged exteriorly of the housing the poles of which exterior magnet coact with the poles of the balance arm and a stop member for said balance arm.

15. A control valve for controlling the circulation of a condensible vapour and its liquid condensate through a condenser, comprising an hermetically sealed housing, condenser inlet and outlet conduit means projecting into said housing, an open vessel within said housing into which vessel the open end of the condenser inlet and outlet means depends, a restricted discharge opening in said vessel, a support for said vessel in the form of a balance arm having its extremities adjacent the housing wall and oppositely magnetically poled and magnetic means disposed exteriorly of the housing in juxtaposition to the poles of the balance arm.

WOLDEMAR G. NOLCKEN.

References Cited in the file of this patent

UNITED STATES PATENTS

| Number | Name | Date |
|---|---|---|
| 2,346,904 | Carlson | Apr. 18, 1944 |
| 2,500,778 | Tobey | Mar. 14, 1950 |
| 2,569,800 | Cataldo | Oct. 2, 1951 |